US008259567B2

(12) United States Patent
Kanauchi et al.

(10) Patent No.: US 8,259,567 B2
(45) Date of Patent: Sep. 4, 2012

(54) MOBILE COMMUNICATION SYSTEM, MOBILE COMMUNICATION METHOD, MOBILE STATION, AND EXCHANGE

(75) Inventors: Masashi Kanauchi, Yokosuka (JP); Norihito Tokuhiro, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 682 days.

(21) Appl. No.: 11/870,166

(22) Filed: Oct. 10, 2007

(65) Prior Publication Data

US 2008/0130493 A1     Jun. 5, 2008

(30) Foreign Application Priority Data

Oct. 10, 2006    (JP) ................................ P2006-277014

(51) Int. Cl.
    *G06F 11/00*    (2006.01)
(52) U.S. Cl. .......................... 370/230; 370/229; 370/438
(58) Field of Classification Search .......... 370/229–235, 370/438–439
    See application file for complete search history.

(56) References Cited

U.S. PATENT DOCUMENTS

| | | | | |
|---|---|---|---|---|
| 6,038,223 | A * | 3/2000 | Hansson et al. ............... | 370/329 |
| 6,233,222 | B1 * | 5/2001 | Wallentin ....................... | 370/229 |
| 6,973,062 | B1 * | 12/2005 | Han ............................... | 370/335 |
| 7,103,656 | B2 * | 9/2006 | Lewis et al. ................... | 709/223 |
| 7,623,459 | B2 * | 11/2009 | Yang et al. ..................... | 370/235 |
| 2003/0040314 | A1 * | 2/2003 | Hogan et al. .................. | 455/435 |
| 2003/0119483 | A1 * | 6/2003 | Jeon ................................ | 455/411 |
| 2004/0081090 | A1 * | 4/2004 | Hara et al. ..................... | 370/229 |
| 2006/0035662 | A1 * | 2/2006 | Jeong et al. .................... | 455/525 |
| 2006/0121905 | A1 * | 6/2006 | McDonald et al. ........... | 455/445 |
| 2008/0137536 | A1 * | 6/2008 | Hede ............................... | 370/236 |

FOREIGN PATENT DOCUMENTS

| | | |
|---|---|---|
| JP | 11-068944 | 3/1999 |
| JP | 2000-115061 | 4/2000 |
| JP | 2000-197088 | 7/2000 |
| WO | WO 2006/104337 A1 | 10/2006 |

OTHER PUBLICATIONS

"3$^{rd}$ Generation Partnership Project: Technical Specification Group Services and System Aspects; Service Accessibility (Release 7)", 3GPP TS 22.011 V7.4.0 (Jun. 2006).

(Continued)

*Primary Examiner* — Phuc Tran
(74) *Attorney, Agent, or Firm* — Oblon, Spivak, McClelland, Maier & Neustadt, L.L.P.

(57) ABSTRACT

An object of the present invention is to avoid congestion, by restricting only processing which causes the congestion without affecting processing which essentially should not be restricted. In a mobile communication system according to the present invention, an exchange MSC/SGSN includes: a congestion factor detector configured to detect a congestion occurrence factor in the switching exchange MSC/SGSN, and a restriction indication transmitter configured to transmit, a restriction indication, to a radio network controller, based on the detected congestion occurrence factor, the restriction indication instructing a processing type that should be restricted in the switching exchange MSC/SGSN congestion occurrence factor. The radio network controller RNC is provided with a broadcast information transmitter configured to transmit broadcast information including the received restriction indication to a mobile station UE.

9 Claims, 17 Drawing Sheets

OTHER PUBLICATIONS

"3rd Generation Partnership Project: Technical Specification Group Radio Access Network; User Equipment (UE) Procedures in Idle Mode and Procedures for Cell Reselection in Connected Mode (Release 7)", 3GPP TS 25.304 V7.0.0 (Mar. 2006).

"3rd Generation Partnership Project; Technical Specification Group Core Network and Terminals; Mobile Radio Interface Layer 3 Specification; Core Network Protocols; Stage 3 (Release 7)", 3GPP TS 24.008 V7.5.0 (Sep. 2006).

"3rd Generation Partnership Project; Techincal Specification Group Radio Access Network; Radio Resource Control (RRC); Protocol Specification (Release 7)", 3GPP TS 25.331 V7.1.0 (Jun. 2006).

3GPP Technical Specification Group Services and System Aspects: "Access Class Barring and Overload Protection", (Release 7) 3rd Generation Partnership Project (3GPP); Technical Report (TR), 23.898, V 7.0.0, XP-002473887, Mar. 1, 2005, pp. 1-27.

"Solution Selection for paging Permission (PPACR) with Access control", C1-080318, NTT DoCoMo, 3 GPP TSG CT WG1 Meeting #51,[Online], XP-002513634, Jan. 28 and Feb. 1, 2008, 4 pages.

"Universal Mobile Telecommunications System (UMTS); 3rd Generation Partnership Project; Technical Specification Group Radio Access Network; Radio Resource Control (RRC); Protocol Specification (3GPP TS 25.331 Version 6.10.0 Release 6); ETSI TS 125 331", XP014035584, Jun. 1, 2006, 1226 pages.

Office Action issued Oct. 21, 2010 in European Patent Application No. 09 177 009.9-2412.

Office Action issued Oct. 21, 2010 in European Patent Application No. 07 019 828.8-2412.

Summons to attend oral proceedings issued May 3, 2011 in Europe Application No. 07019828.8.

Summons to attend oral proceedings issued May 3, 2011 in Europe Application No. 09177009.9.

\* cited by examiner

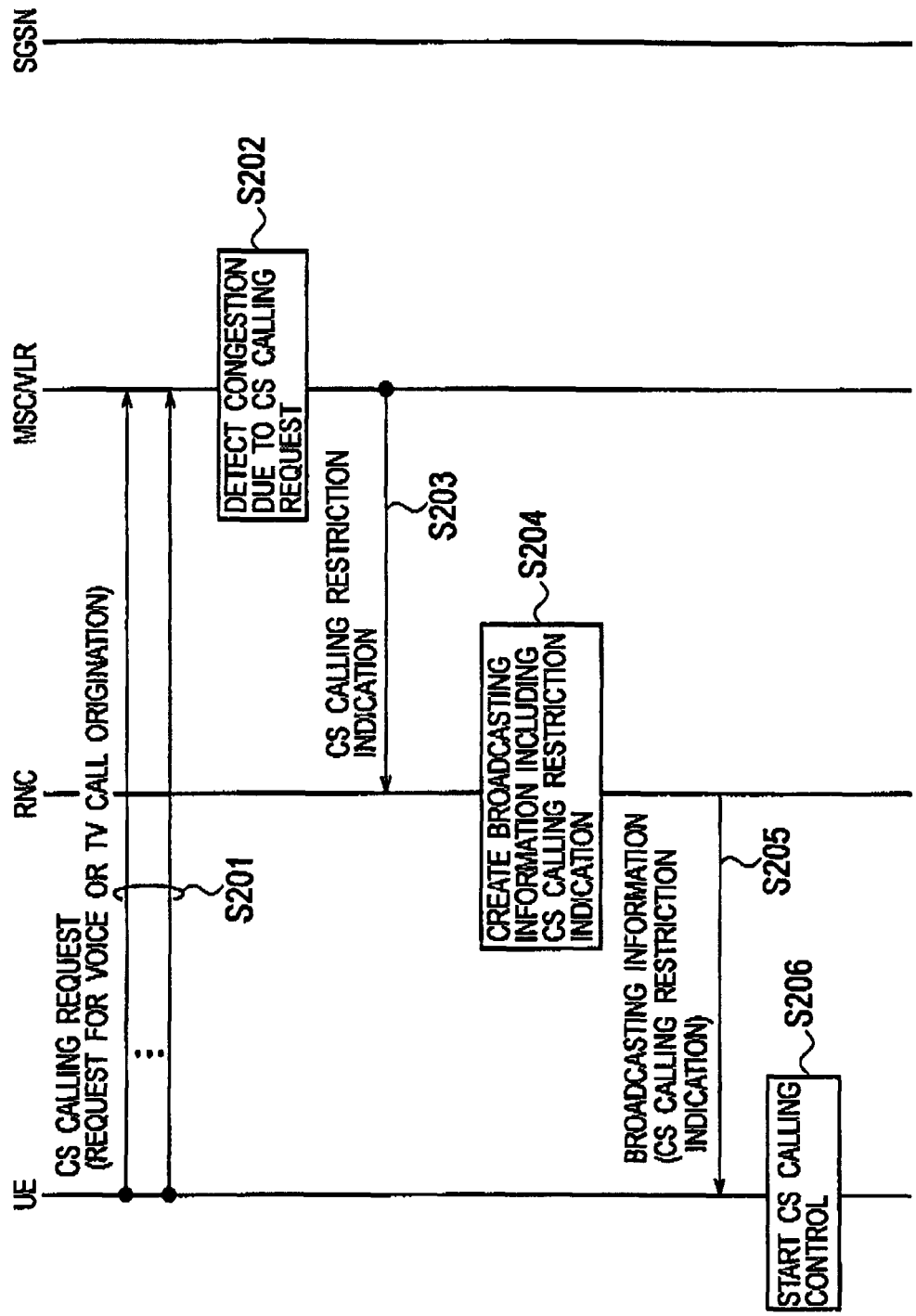

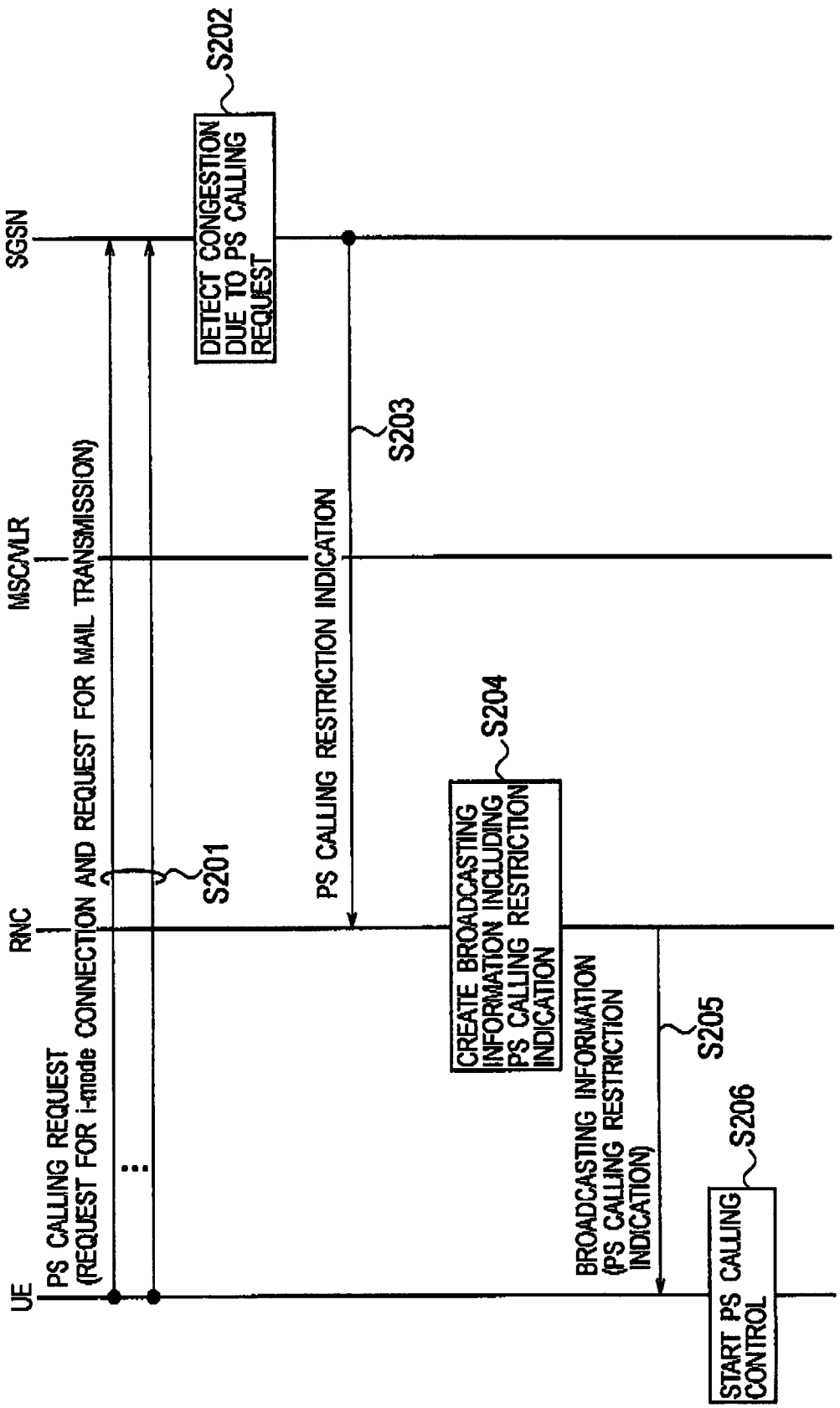

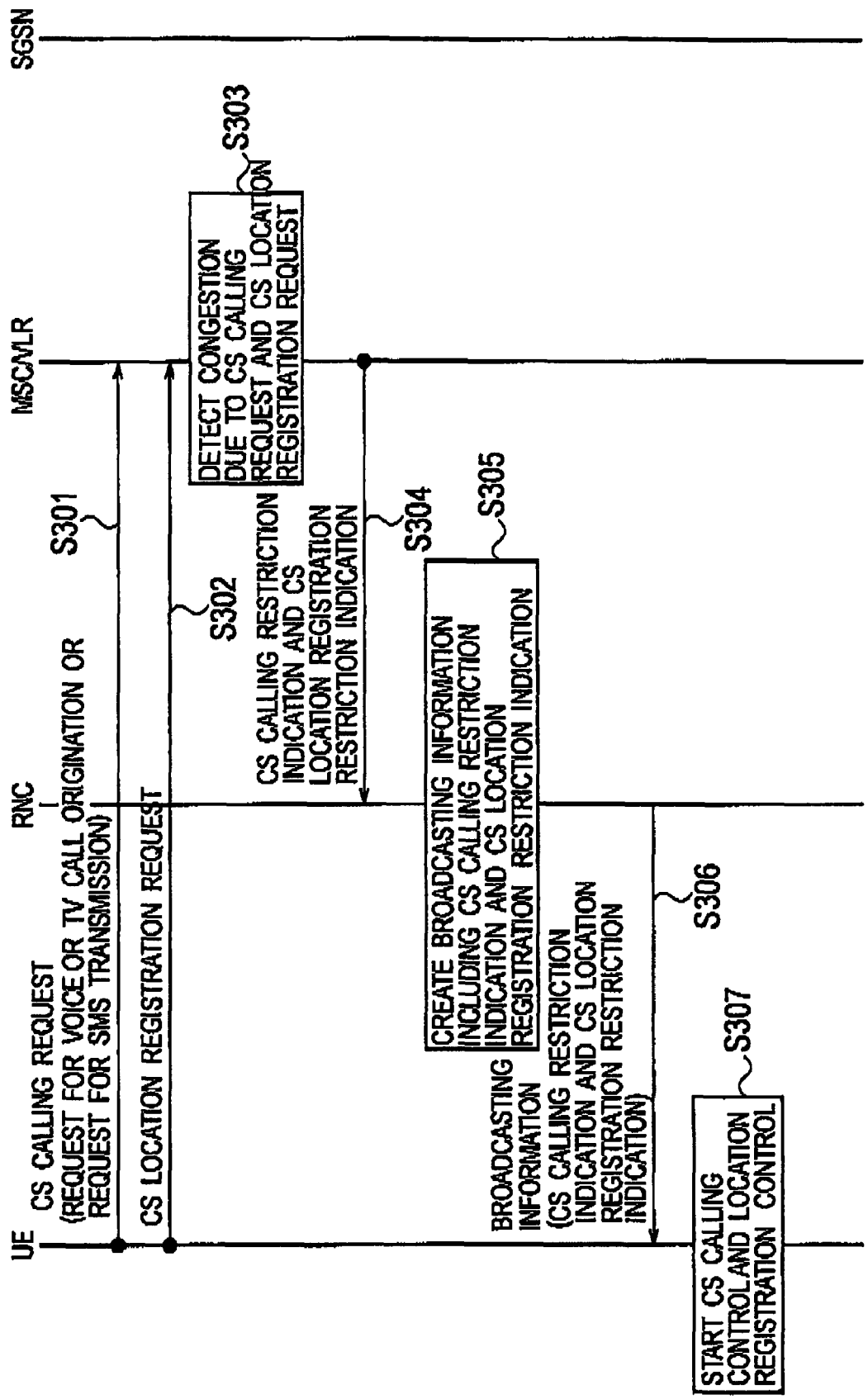

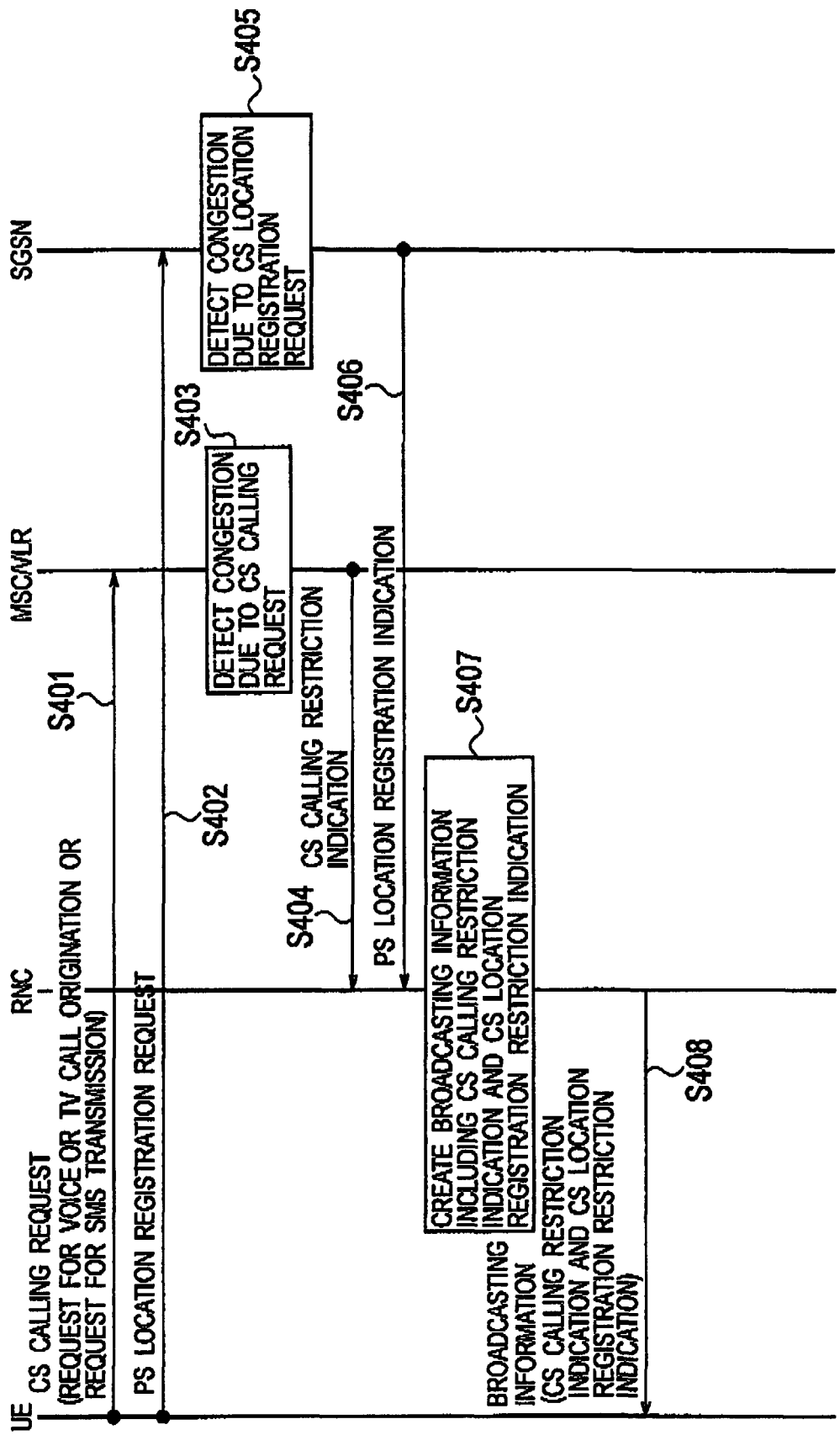

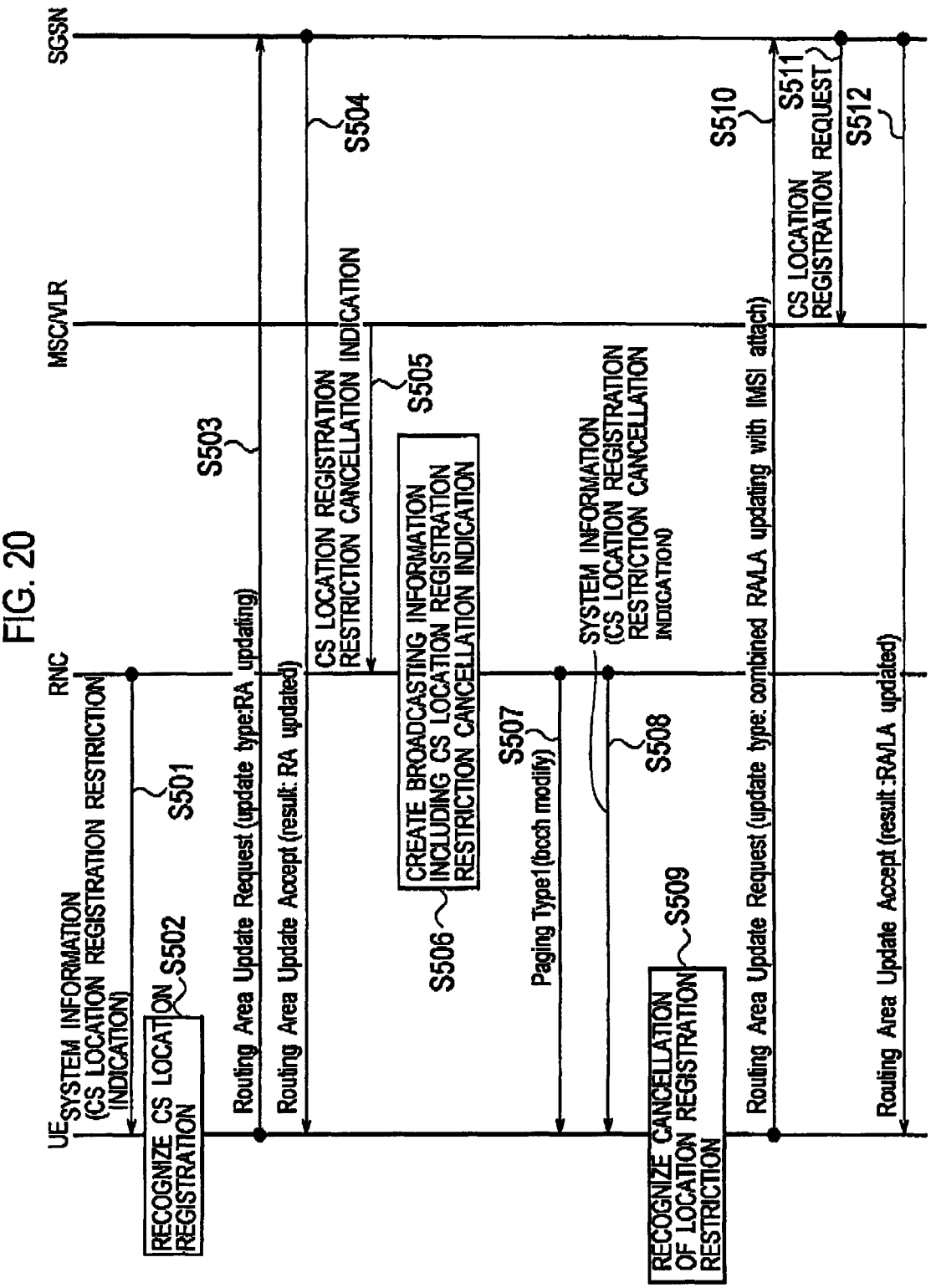

MOBILE COMMUNICATION SYSTEM, MOBILE COMMUNICATION METHOD, MOBILE STATION, AND EXCHANGE

CROSS REFERENCE TO RELATED APPLICATION

This application is based upon and claims the benefit of priority from the prior Japanese Patent Application No. P 2006-277014, filed on Oct. 10, 2006; the entire contents of which are incorporated herein by reference.

BACKGROUND OF THE INVENTION

1. Field of the Invention

The present invention relates to a mobile communication system, a mobile communication method, a mobile station, and an exchange.

2. Description of the Related Art

In conventional mobile communication systems, for example, all mobile stations of passengers on a train start transmission of a location registration request at the same time when the train crosses over from one location registration area to another location registration area, which causes a problem that overloads for processing are imposed on radio capacity and an exchange.

In addition, there is also another problem that when a large amount of calling processing is performed at the same time for a specific event (for example, application for a TV program or the like), the transmission of calling requests for performing the calling processing causes overloads for processing on a radio capacity and an exchange.

To solve these problems, current 3GPP specifications define "Domain Specific Access Control (hereinafter referred to as DSAC)". In accordance with the DSAC, a mobile communication system is configured to separately restrict processing in a circuit switch and processing in a packet switch if congestion is caused in a network.

Note that a mobile communication system to which the DSAC is not applied is configured to restrict (prohibit) all the processing in a circuit switch and a packet switch when congestion is caused in a circuit switched network or a packet switched network. Accordingly, a mobile station cannot perform calling/call-receiving processing and location registration processing through either the circuit switch or the packet switch.

In addition, a mobile communication system to which the DSAC is applied has a configuration in which, when congestion is caused in a circuit switched network or a packet switched network, all the processing is prohibited in a domain having the congestion caused, that is, in an exchange (a circuit switch or a packet switch) in the network having the congestion caused. Thus, the mobile station cannot perform calling/call-receiving processing and location registration processing through the exchange (the circuit switching exchange or the packet switching exchange) in the network having the congestion caused.

Referring to FIGS. 1 to 3, the description will be given of an operation to restrict processing performed in each exchange in a mobile communication system to which a conventional DSAC is applied.

As shown in FIGS. 1 to 3, at step S1000, a circuit switching exchange MSC or a packet switching exchange SGSN detects congestion caused in a circuit switched network or a packet switched network.

At step S1001, the exchange detecting the congestion (the circuit switching exchange MSC or the packet switching exchange SGSN) transmits, to the radio network controller RNC, "a CS restriction indication" or "a PS restriction indication" for instructing to restrict all the processing in the circuit switching exchange MSC or the packet switching exchange SGSN.

At step S1002, the radio network controller RNC creates broadcast information including the received CS restriction indication or the PS restriction indication. At step S1003, the radio network controller RNC transmits the created broadcast information through a radio base station BTS to a location registration area belonging to the radio network controller RNC.

As a result, the mobile station cannot perform the calling/call-receiving processing and the location registration processing through the exchange (the circuit switching exchange or the packet switching exchange) in the network in which congestion is caused.

[Non-patent Document 1] 3GPP TS.24.008 V6.1.2.0 (6.c.0), issued in March 2006

[Non-patent Document 2] 3GPP TS.25.331 V6.5.0, issued in March 2005

In general, a main factor of congestion in a network is specific processing like location registration processing, calling processing, and the like. Thus, in many cases, it is sufficient to restrict only some of such processing in an exchange, that is, it is not necessary to restrict all the processing in the exchange.

However, a mobile communication system to which the conventional aforementioned DSAC is applied is configured to restrict all the processing in a circuit switch or a packet switch for all mobile stations that belong to a specific location registration area. For this reason, there is a problem that such unnecessarily-prohibitive restrict affects call-receiving processing of a mobile station in the area, which processing essentially should not be restricted, or location registration processing by a mobile station which moves to the specific location registration area.

SUMMARY OF THE INVENTION

The present invention has been made in view of the forgoing problems. Accordingly, it is an object of the present invention to provide a mobile communication system, a mobile communication method, a mobile station and an exchange, which are capable of avoiding congestion by restricting only processing causing the congestion without affecting processing that essentially should not be restricted.

A first aspect of the present invention is summarized as a mobile communication system including a radio network controller and an exchange, wherein the exchange includes a congestion factor detector configured to detect a congestion occurrence factor showing a processing which causes a congestion to occur in the exchange, and; a restriction indication transmitter configured to transmit a restriction indication per the processing, to the radio network controller based on the detected congestion occurrence factor, the restriction indication instructing a type of the processing which should be restricted in the exchange and, the radio network controller comprises: a broadcast information transmitter configured to transmit, to a mobile station, broadcast information including the received restriction indication.

In the first aspect, the exchange is any one of a circuit switching exchange and a packet switching exchange In the first aspect, the type of the processing shows at least one of location registration processing and calling processing.

A second aspect of the present invention is summarized as a mobile communication method for performing mobile communications through a radio network controller and an exchange, including: detecting, at the exchange, a congestion occurrence factor showing a processing which causes a congestion to occur in the exchange; transmitting, at the exchange, a restriction indication per the processing, to the radio network controller based on the detected congestion occurrence factor, the restriction indication instructing a type of the processing which should be restricted in the exchange; transmitting, at the radio network controller, to a mobile station, broadcast information including the received restriction indication; and restricting, at the mobile station, processing corresponding to the restriction indication included in the received broadcast information.

A third aspect of the present invention is summarized as a mobile station configured to perform mobile communications through a radio network controller and an exchange, including: a broadcast information receiver configured to receive broadcast information transmitted from the radio network controller; an analyzer configured to analyze a specific processing in a specific exchange to be restricted on the basis of a restriction indication per the processing, included in the received broadcast information; and a processor configured to restrict the specific processing in the analyzed specific exchange.

A forth aspect of the present invention is summarized as an exchange used in a mobile communication system, including; a congestion factor detector configured to detect a congestion occurrence factor showing a processing which causes a congestion to occur in the exchange; and a restriction indication transmitter configured to transmit, a restriction indication, to a radio network controller in the mobile communication system based on the detected congestion occurrence factor, the restriction indication instructing a type of the processing which should be restricted in the exchange.

BRIEF DESCRIPTION OF THE SEVERAL VIEWS OF THE DRAWINGS

FIG. 16 is a diagram illustrating an operation when CS calling restrict is performed in the mobile communication system according to the first embodiment of the present invention;

FIG. 17 is a sequential diagram showing an operation when the CS calling restrict is performed in the mobile communication system according to the first embodiment of the present invention;

FIG. 18 is a sequential diagram showing operations when the CS calling restrict and the CS location registration restrict are performed in the mobile communication system according to the first embodiment of the present invention;

FIG. 19 is a sequential diagram showing operations when the CS calling restrict and the PS location registration restrict are performed in the mobile communication system according to the first embodiment of the present invention; and FIG. 20 is a sequential diagram sowing an operation when the CS location registration restrict is cancelled in the mobile communication system according to the first embodiment of the present invention.

DETAILED DESCRIPTION OF THE INVENTION

Configuration of a Mobile Communication System According to the First Embodiment of the Present Invention The configuration of a mobile communication system according to a first embodiment of the present invention will be described below by referring to FIGS. 4 to 12.

Figure 12:
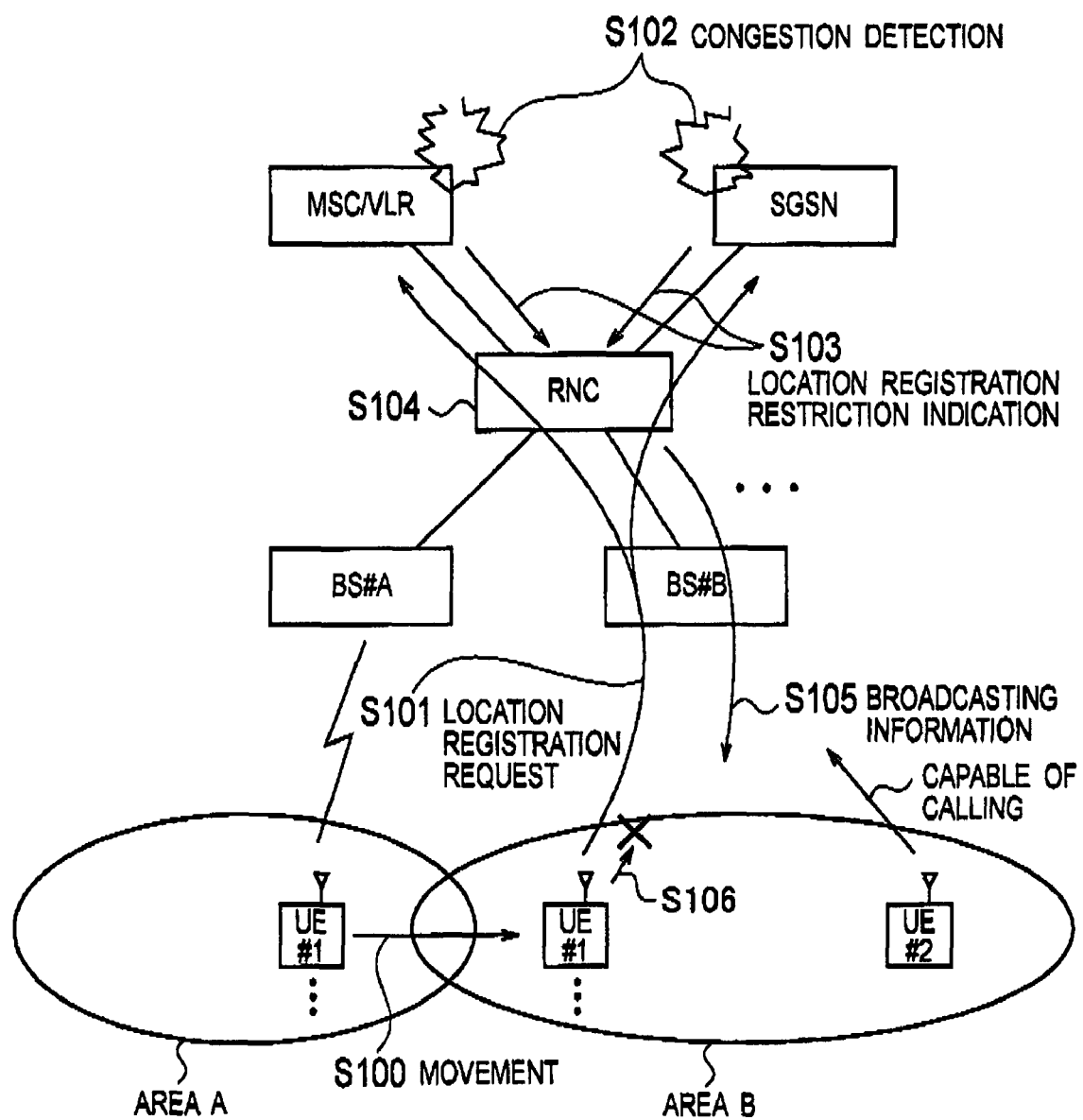
FIG. 12 is a diagram illustrating an operation when CS location registration restrict is performed in a mobile communication system according to the first embodiment of the present invention.

As shown in FIG. 12, the mobile communication system according to the present embodiment is provided with an exchange (a circuit switching exchange MSC or a packet switching exchange SGSN), a radio network controller RNC, a plurality of base stations BS#A and BS#B and a plurality of mobile stations UE#1 and UE#2.

The circuit switching exchange MSC is a device responsible for circuit switched services and is configured to perform location registration processing for a circuit switched network of a mobile station UE and to perform communication restrict in the circuit switched network.

In addition, the packet switching exchange SGSN is a device responsible for packet switched services and is configured to perform location registration processing for a packet switched network of the mobile station UE and to perform communication restrict in the packet switched network.

Figure 1:
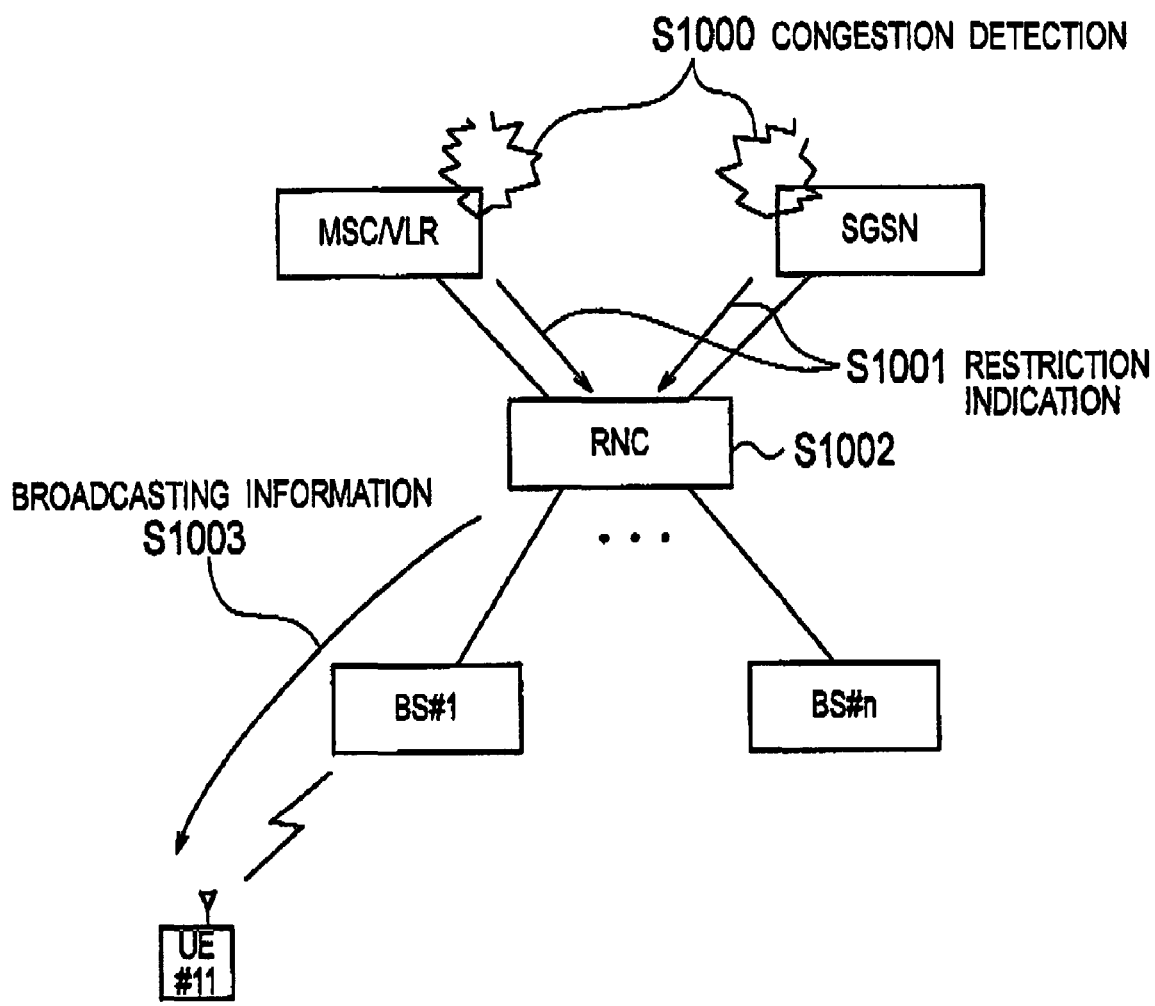
FIG. 1 is a diagram illustrating an operation when CS restrict or PS restrict is performed in a conventional mobile communication system.
Figure 2:
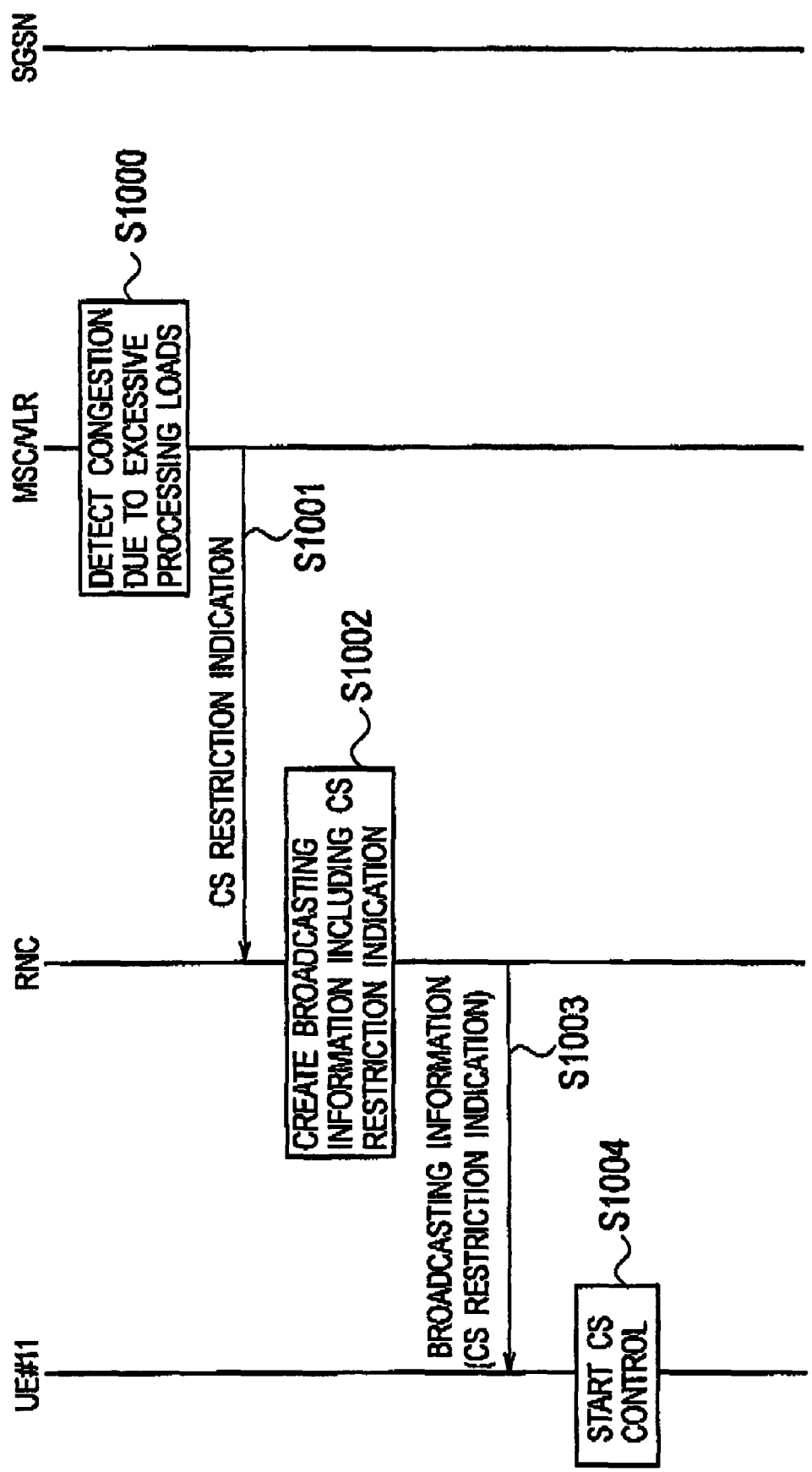
FIG. 2 is a sequential diagram showing an operation when the CS restrict is performed in the conventional mobile communication system.
Figure 3:
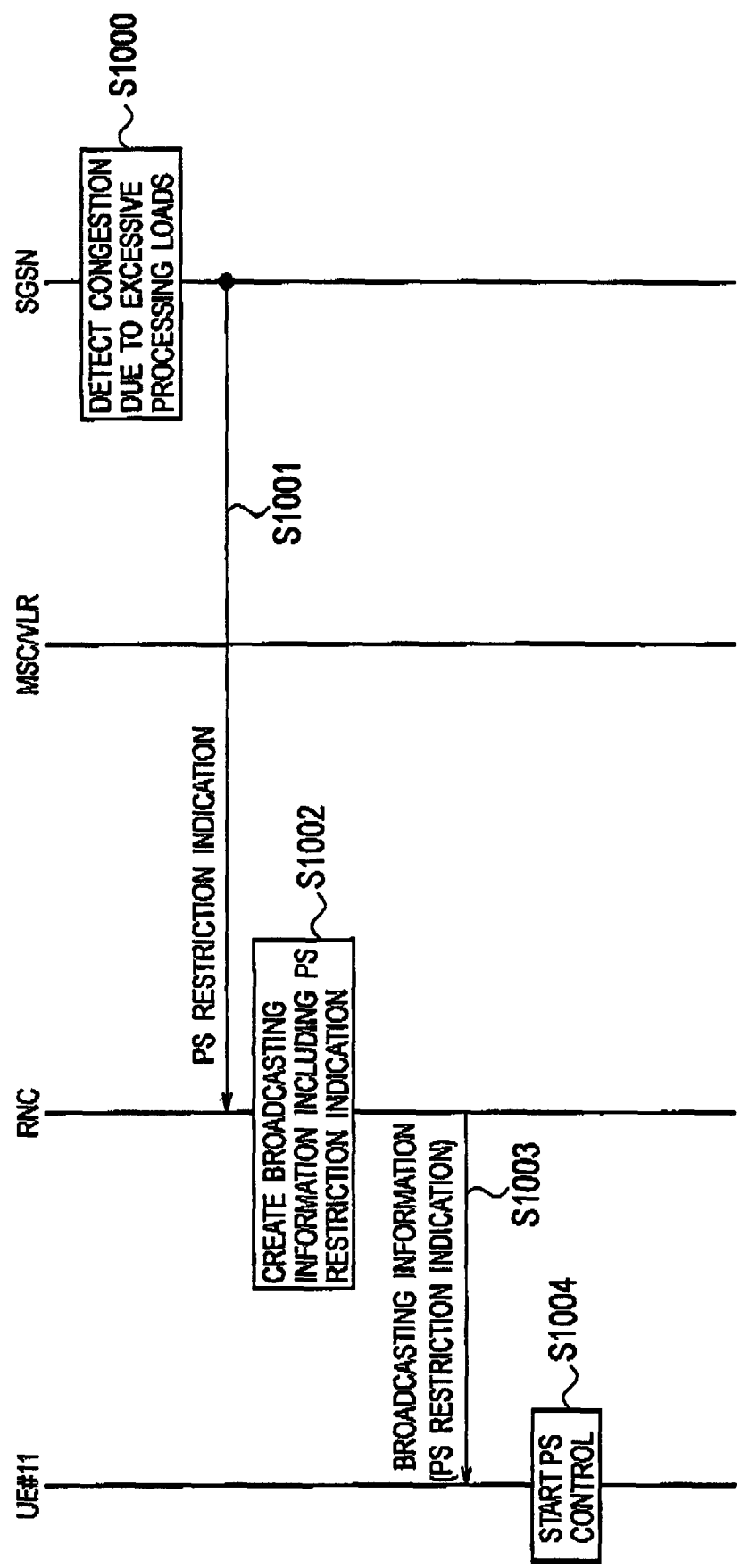
FIG. 3 is a sequential diagram showing an operation when the PS restrict is performed in the conventional mobile communication system.
Figure 4:
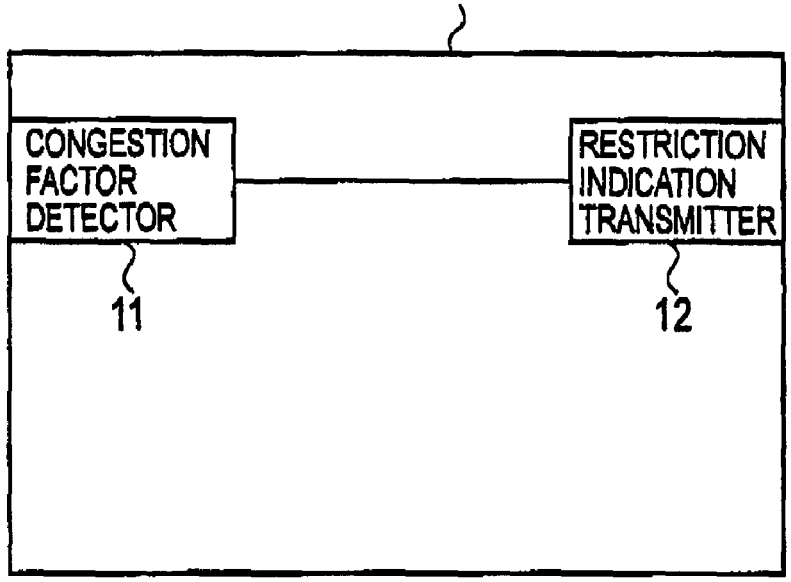
FIG. 4 is a functional block diagram of an exchange according to a first embodiment of the present invention.

As shown in FIG. 4, the switching exchange MSC or SGSN is provided with a congestion factor detector 11 and a restriction indication transmitter 12.

The congestion factor detector 11 is configured to detect a congestion occurrence factor showing a processing which causes a congestion to occur in the switching exchange MSC or SGSN.

Specifically, the congestion factor detector 11 is configured to detect which processing caused congestion to occur in the switching exchange MSC or SGSN.

For example, the congestion factor detector 11 may be configured to detect a occurrence of congestion based on a CPU usage. For example, if a process with a CPU usage being higher than a predetermined threshold (for example, a location registration process or a calling process) is detected, the congestion factor detector 11 determines that this process caused congestion to occur.

Note that the congestion factor detector 11 may be configured to detect congestion is caused by a single congestion factor or may be configured to detect congestion is caused by a plurality of factors.

The restriction indication transmitter 12 is configured to transmit, to the radio network controller RNC, a restriction indication per the processing for instructing a type of processing (for example, location registration processing or calling processing) which should be restricted in the switching exchange MSC or SGSN, based on the congestion occurrence factor detected by the congestion factor detector 11.

For example, if the restriction indication transmitter 12 detects a process with a CPU usage higher than a predetermined threshold (for example, a location registration process or a calling process), the restriction indication transmitter 12 may be configured to transmit a restriction indication (for example, a location registration restriction indication or a calling restriction indication) for instructing to restrict corresponding processing (for example, location registration processing or calling processing) on the mobile station UE side.

Note that the restriction indication transmitter 12 may be configured to transmit a restriction indication for restricting single processing or may be configured to transmit a restriction indication for restricting a plurality of processing.

The radio network controller RNC is a device responsible for performing processing of radio communication control with the mobile stations UE.

In addition, the radio network controller RNC is configured to exchange predetermined information with the mobile station UE through a radio network and is configured to notify the switching exchange MSC/SGSN of the predetermined information exchanged with the mobile station UE.

Figure 5:
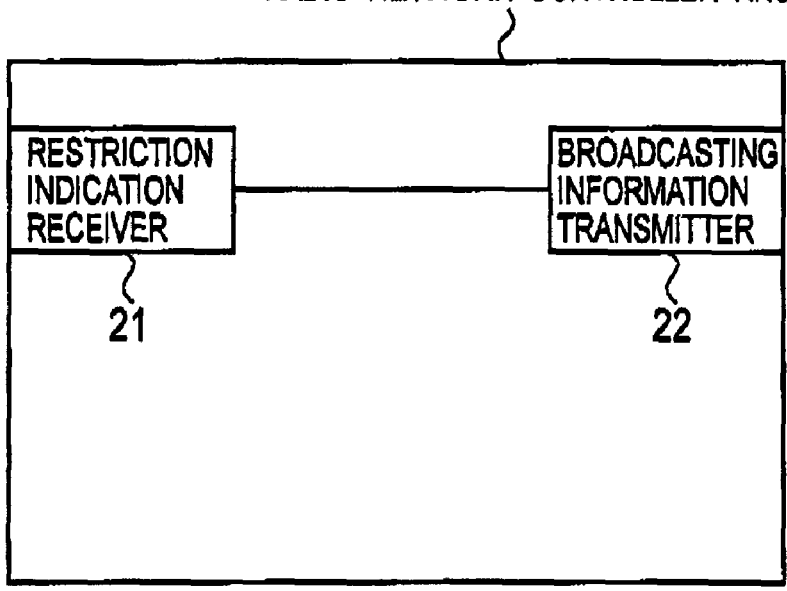
FIG. 5 is a functional block diagram of a radio network controller according to the first embodiment of the present invention.

As shown in FIG. 5, the radio network controller RNC is provided with a restriction indication receiver 21 and a broadcast information transmitter 22.

The restriction indication receiver 21 is configured to receive a restriction indication transmitted from the switching exchange MSC/SGSN.

The broadcast information transmitter 22 is configured to create broadcast information including the restriction indication received by the restriction indication receiver 21 to transmit the information to the mobile station UE.

Here, the broadcast information transmitter 22 is configured to separately create and transmit broadcast information for the circuit switched network and broadcast information for the packet switched network.

Note that the broadcast information transmitter 22 may create and transmit broadcast information for restricting one processing or may create and transmit broadcast information for restricting a plurality of processing.

Figure 6:
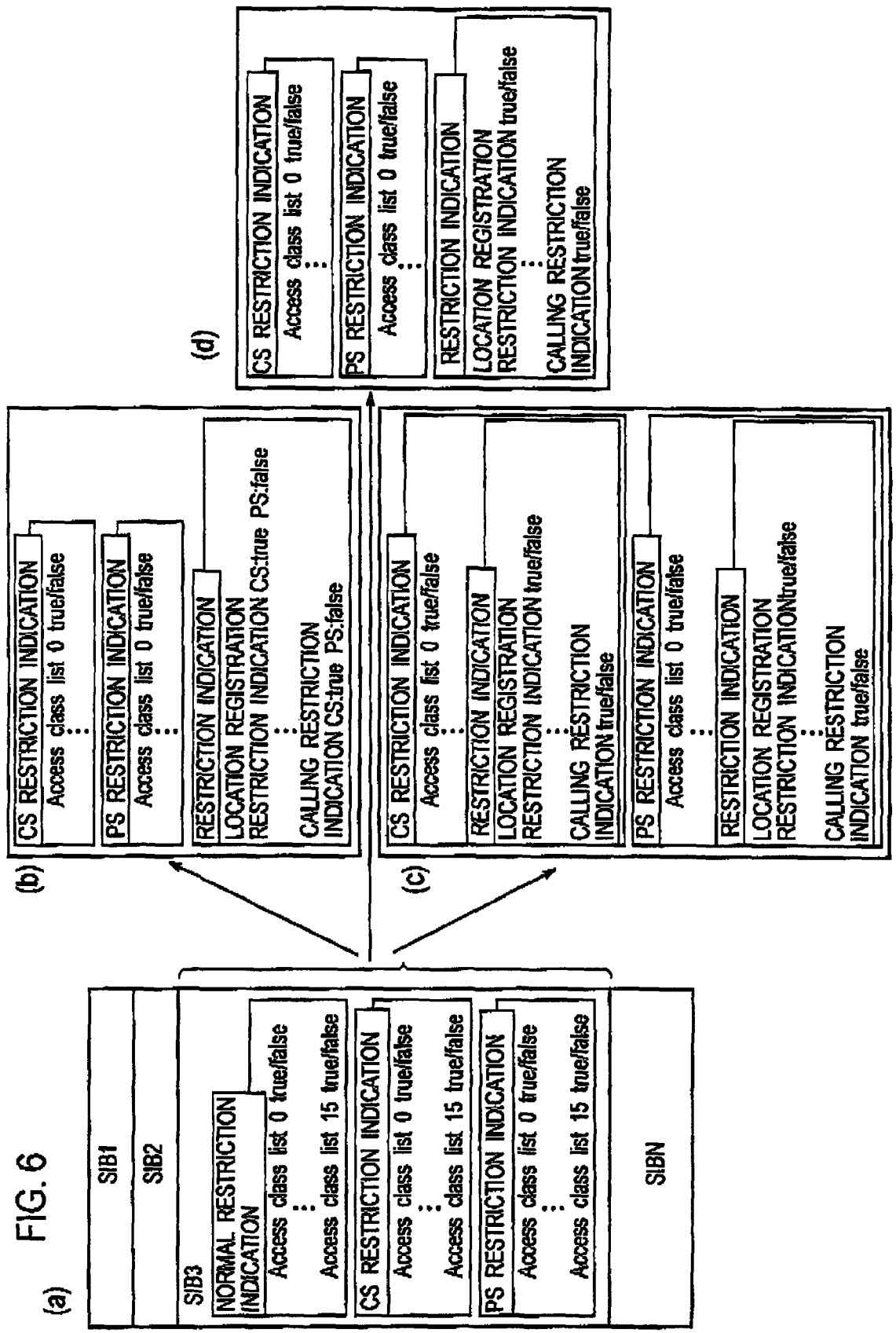
FIG. 6 is a diagram showing one example of restrict information to be received in the radio network controller according to the first embodiment of the present invention.

FIG. 6 shows one example of broadcast information created by the broadcast information transmitter 22.

Figure 7:
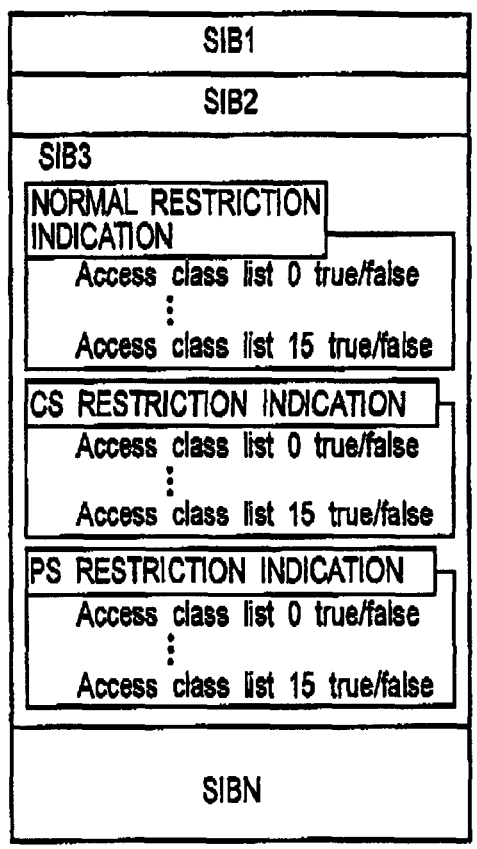
FIG. 7 is a diagram showing one example of restrict information to be received in the radio network controller according to the first embodiment of the present invention.

As shown in FIG. 7, broadcast information used in a conventional mobile communication system is configured so that "SIB3 (System Information Block Type 3)" defined by 3GPP would include a normal restriction indication, a CS restriction indication, and a PS restriction indication.

Figure 8:
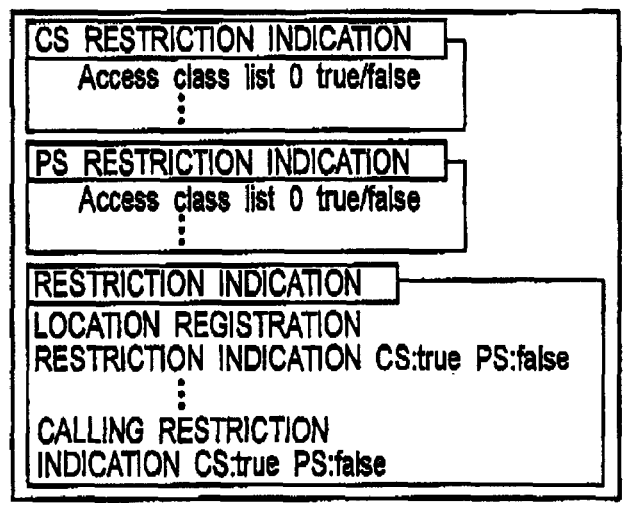
FIG. 8 is a diagram showing one example of restrict information to be received in the radio network controller according to the first embodiment of the present invention.
Figure 9:
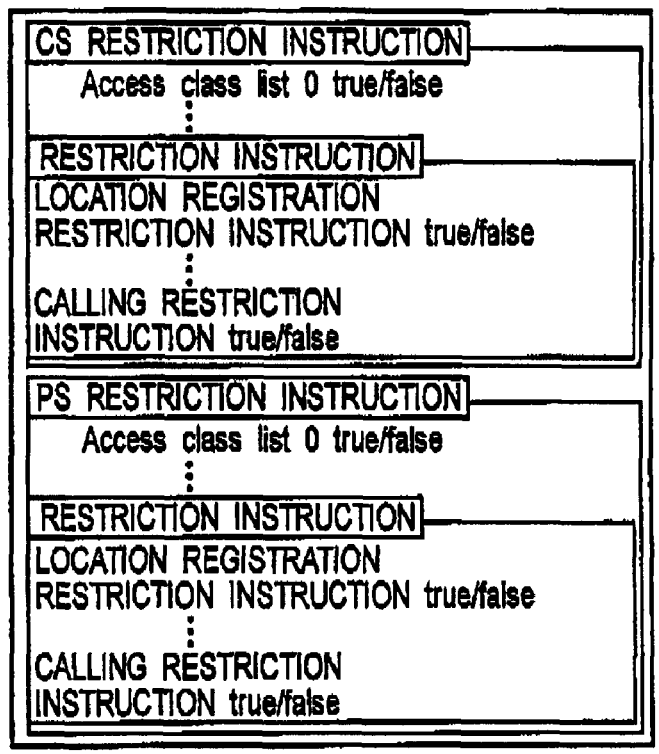
FIG. 9 is a diagram showing one example of restrict information to be received in the radio network controller according to the first embodiment of the present invention.
Figure 10:
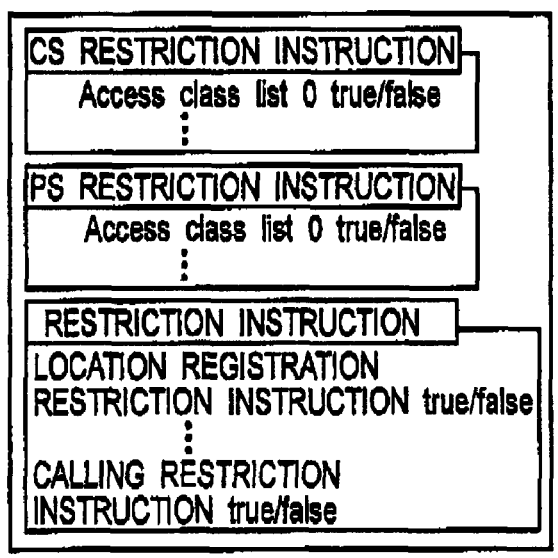
FIG. 10 is a diagram showing one example of restrict information to be received in the radio network controller according to the first embodiment of the present invention.

In contrast, as shown in FIGS. 8 to 10, the mobile communication system according to the present invention is configured so that the broadcast information transmitter 22 adds a restriction indication (a location registration restriction indication, an originating restriction indication, or the like) to "SIB3" and broadcast them to a plurality of mobiles stations UE.

Specifically, as shown in FIG. 8, the broadcast information transmitter 22 may be configured to add information elements showing restriction indications such as a location registration restriction indication, a calling restriction indication, a call-receiving restriction indication, and the like to "SIB3" and to define "presence or absence of a CS restrict (true or false)" and "present or absent of a PS restrict (true or false)" for each of the information elements.

For example, if the Cs restrict is "true", the location registration restriction indication is "true", and the restriction indication other than these is "false", the mobile station UE can determined that "only the location registration processing in the circuit switching exchange MSC is restricted".

In addition, as shown in FIG. 9, the broadcast information transmitter 22 may be configured to add information elements showing restriction indications respectively to the information element showing the CS restriction indication and the information element showing the PS restriction indication in the "SIB3" and to define "presence or absence of a location registration restrict", "presence or absence of a calling restrict", "presence or absence of a call-receiving restrict" and the like respectively in the information elements showing the added restriction indications.

For example, if the location registration processing in the circuit switching exchange MSC and the calling processing in the packet switching exchange SGSN are restricted, "Access class" in the information element showing the Cs restriction indication is "true", and only "the location registration restriction indication" in the information element showing the restriction indication in the information element showing the CS restriction indication is "true", "Access class" in the information element showing the PS restriction indication is "true", and only "the calling restriction indication" in the information element showing the restriction indication in the information element showing the PS restriction indication is "true".

In addition, as shown in FIG. 10, the broadcast information transmitter 22 may be configured to add an information element showing a restriction indication separately from the information element showing the CS restriction indication and the information element showing the PS restriction indication in "SIB3" and to define "presence or absence of a location registration restrict", "presence or absence of a calling restrict", "presence or absence of a call-receiving restrict", and the like in each of the information elements showing the added restriction indications.

According to the example of FIG. 10, the broadcast information transmitter 22 can define "presence or absence of a location registration restrict", "presence or absence of a calling restrict", "presence or absence of a call-receiving restrict", and the like regardless of "the presence or absence of the CS restrict" and "the presence or absence of the PS restrict".

For example, even if both of the CS restrict and the PS restrict are "false", the mobile station US is restricted in the processing that the information element showing a restriction indication is "true".

Note that the broadcast information transmitter 22 may be configured to create and transmit broadcast information including a restriction indication if congestion is caused in the radio capacity.

Figure 11:
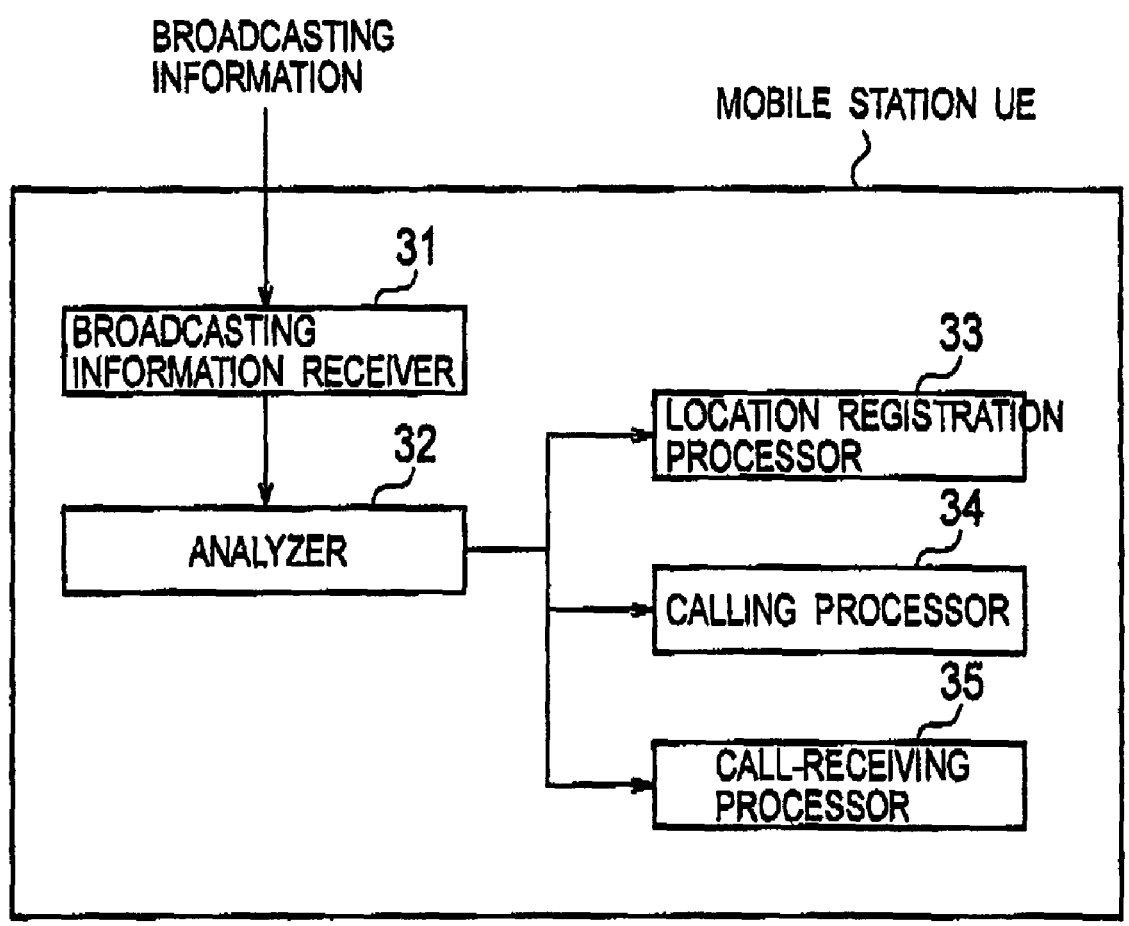
FIG. 11 is a functional block diagram of a mobile station according to the first embodiment of the present invention.

As shown in FIG. 11, the mobile station UE is provided with a broadcast information receiver 31, an analyzer 32, a location registration processor 33, a calling processor 34, and a call-receiving processor 35.

The broadcast information receiver 31 is configured to receive broadcast information transmitted from the radio network controller RNC.

The analyzer 32 is configured to analyze specific processing in the specific exchange (the circuit switching exchange MSC or the packet switching exchange SGSN) to be restricted based on the restriction indication included in the broadcast information received by the broadcast information receiver 31 (see, FIG. 6).

The location registration processor 33, the calling processor 34, and the call-receiving processor 35 are configured to suppress the specific processing in the specific exchange (the circuit switching exchange MSC or the packet switching exchange SGSN) analyzed by the analyzer 32.

Specifically, the location registration processor 33 is configured to transmit a Cs location registration request or a PS location registration request to the circuit switching exchange MSC or the packet switching exchange SGSN to perform location registration processing.

In addition, the location registration processor 33 is configured to suppress the location registration processing in the specific exchange (the circuit switching exchange MSC or the packet switching exchange SGSN) analyzed by the analyzer 32.

Specifically, the calling processor 34 is configured to perform calling processing by transmitting a CS calling request or a PS calling request to the circuit switching exchange MSC or the packet switching exchange SGSN.

In addition, the calling processor 34 is configured to suppress calling processing in the specific exchange (the circuit switching exchange MSC or the packet switching exchange SGSN) analyzed by the analyzer 32.

Specifically, the call-receiving processor 35 is configured to perform call-receiving processing by receiving a CS call-receiving notification or a PS call-receiving notification from the circuit switching exchange MSC or the packet switching exchange SGSN.

In addition, the call-receiving processor 35 is configured to suppress call-receiving processing in the specific exchange (the circuit switching exchange MSC or the packet switching exchange SGSN) analyzed by the analyzer 32.

Operation of the Mobile Communication System According to the First Embodiment of the Present Invention By referring to FIGS. 11 to 20, the operation of the mobile communication system according to the first embodiment of the present invention will be described. Note that in examples of FIGS. 11 to 20, a base station BS only transfers information, and the description thereof will be omitted.

Figure 13:
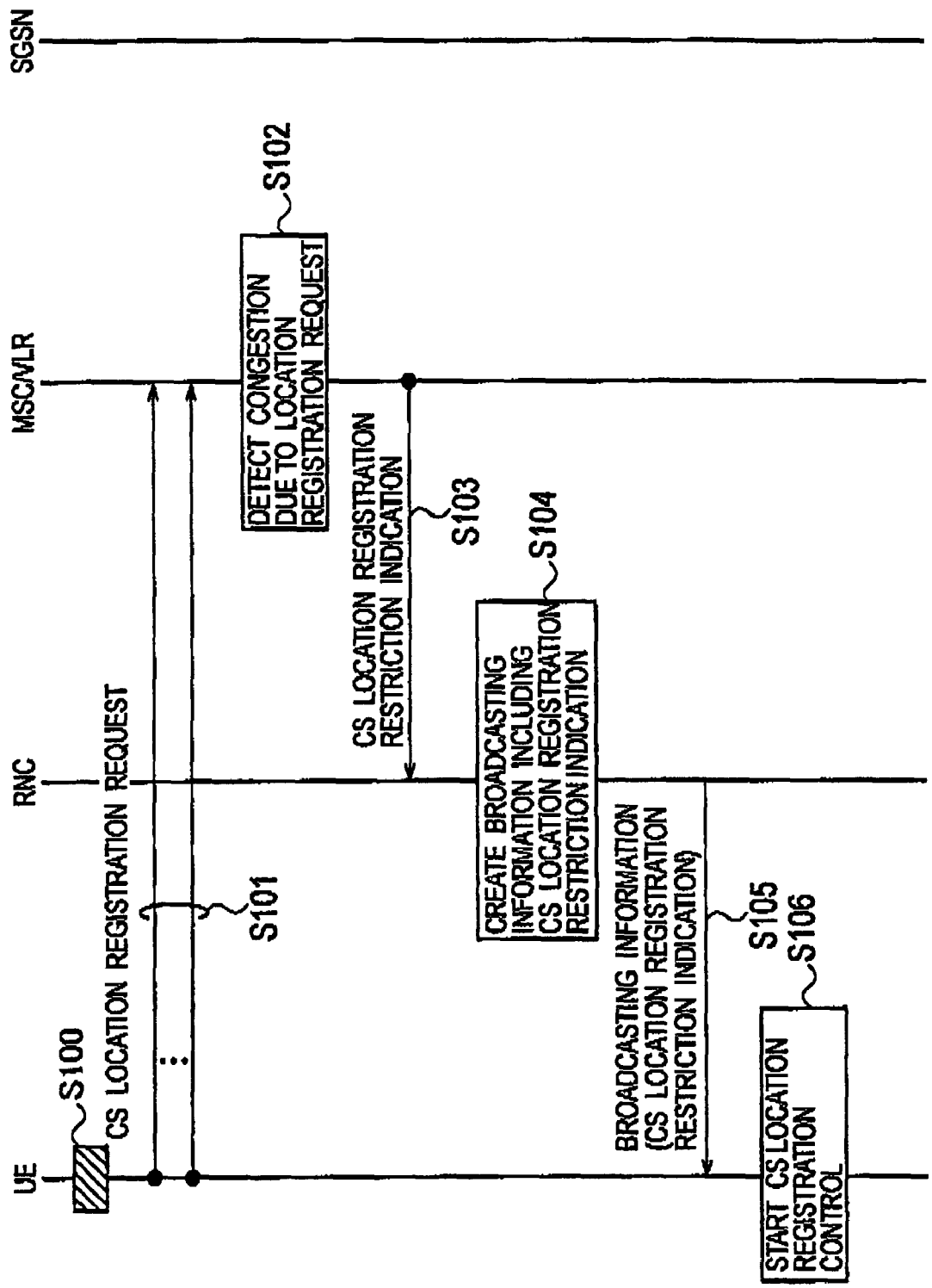
FIG. 13 is a sequential diagram showing an operation when the CS location registration restrict is performed in the mobile communication system according to the first embodiment of the present invention.
Figure 14:
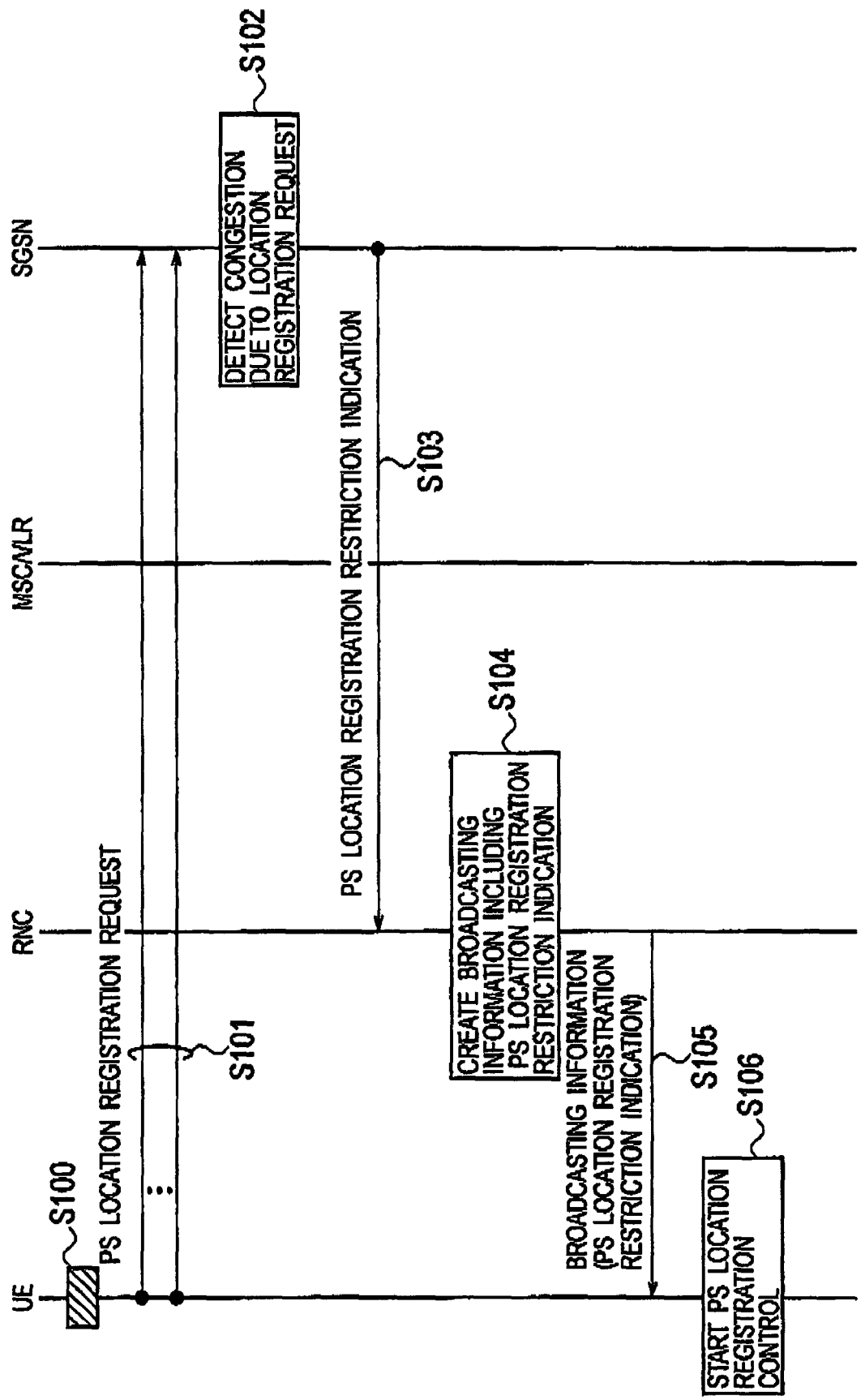
FIG. 14 is a diagram illustrating an operation when PS location registration restrict is performed in the mobile communication system according to the first embodiment of the present invention.

Firstly, by referring to FIGS. 12 to 14, the description will be given of an operation which is performed in a case where a CS location registration restrict or a PS location registration restrict is performed in the mobile communication system according to the present embodiment.

If a train moves from a location registration area A to a location registration area B at step S100, mobile stations UE#1 of users on the train transmit location registration requests (CS location registration requests, PS location registration requests, or CS/PS location registration requests) at the same time, in the location registration area B at step S101.

At step S102, an exchange (a circuit switching exchange MSC or a packet switching exchange SGSN) receives a large amount of location registration requests, which causes congestion.

At step S103, the switching exchange MSC or SGSN transmits, to a radio network controller RNC, a location registration restriction indication (a CS location registration restriction indication or a PS location registration restriction indication) for restricting location registration processing in the exchange.

At step S104, the radio network controller RNC creates broadcast information including the received location registration restriction indication, and at step S105 transmits the created broadcast information through broadcast to the location registration area B.

At step S106, by receiving and analyzing the broadcast information, the mobile station UE#1 recognizes that the location registration processing is restricted in the location registration area B and suppresses the location registration processing in the location registration area B.

Note that even in such a case, since a mobile station UE#2 which already belongs to the location registration area B has already performed the location registration processing, the mobile station UE#2 can perform calling and call-receiving processing.

In particular, in a boundary of a location registration area along a rail road, the radio network controller RNC continuously transmits broadcast information including the location registration restriction indication (note that a restrict rate is changed in operation) to prevent the location registration processing from being performed at the same time, so that the above-mentioned congestion can be prevented.

Figure 15:
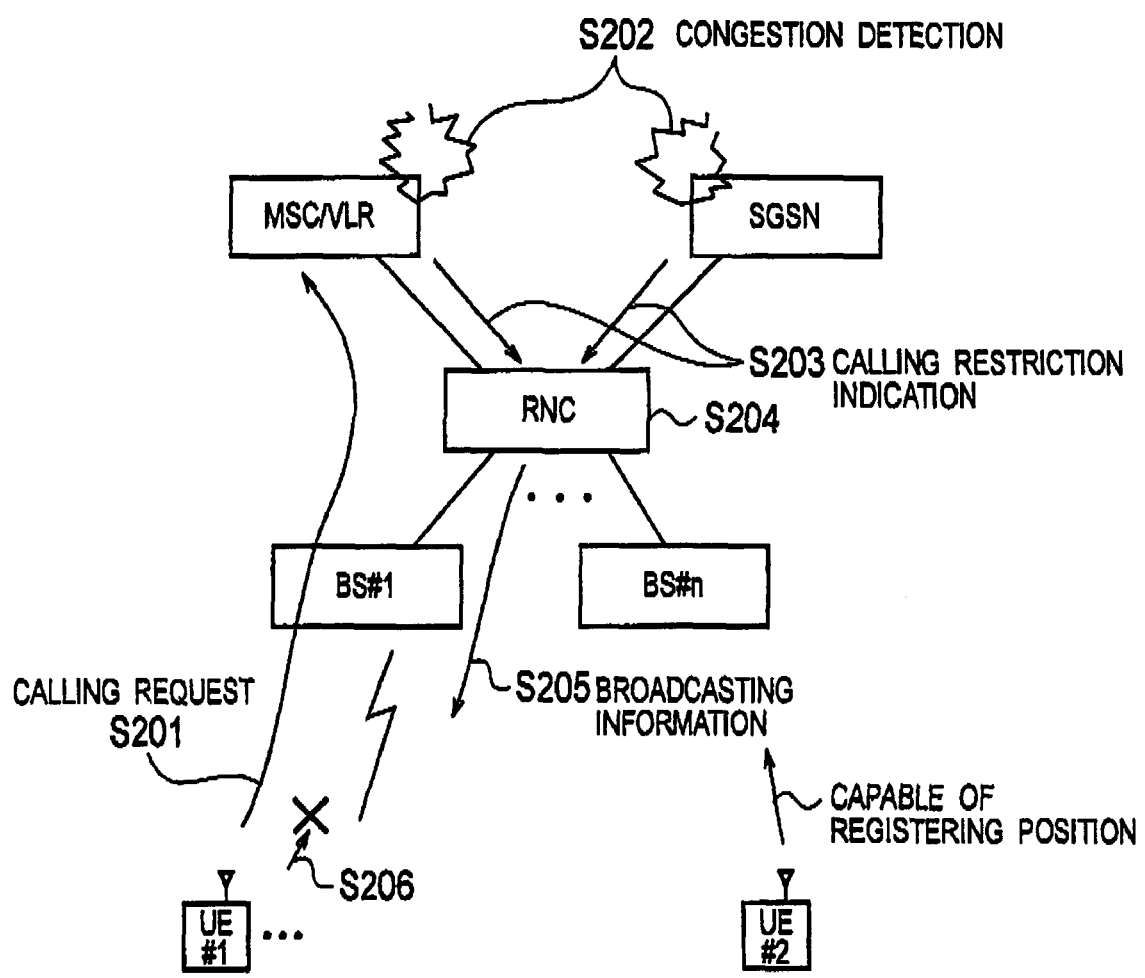
FIG. 15 is a sequential diagram showing an operation when the PS location registration restrict is performed in the mobile communication system according to the first embodiment of the present invention.

Secondly, by referring to FIGS. 15 to 17, the description will be given of an operation which is performed in a case where Cs calling restrict or PS calling restrict is performed in the mobile communication system according to the present invention.

At step S201, mobile stations US transmit calling requests (CS calling requests (for example, voice call origination requests or TV call origination requests)) or PS calling requests (for example, i-mode (registered trade mark) connection requests or mail transmission requests) at the same time on the occasion of a specific event.

At step S202, the exchange (the circuit switching exchange MSC or the packet switching exchange SGSN) receives a large amount of calling requests, which causes congestion.

At step S203, the switching exchange MSC or SGSN transmits, to the radio network controller RNC, a calling restriction indication (a CS calling restriction indication or a PS calling restriction indication) for restricting calling processing in the exchange.

At step S204, the radio network controller RNC creates broadcast information including the received calling restriction indication, and at step S205, transmits the created broadcast information through broadcast to a specific area.

At step S206, by receiving and analyzing the broadcast information, the mobile station UE recognizes that the calling processing is restricted in the specific area and suppresses the calling processing in the specific area.

Thirdly, by referring to FIG. 18, the description will be given of an operation which is performed in a case where a CS calling restrict and a CS location registration restrict is performed in the mobile communication system according to the present embodiment.

At step S301, a plurality of mobile stations UE transmit CS calling requests, and at step S302 transmit CS location registration requests.

At step S303, the circuit switching exchange MSC receives a large amount of the CS calling requests and the CS location registration requests, which causes congestion.

At step S304, the circuit switching exchange MSC transmits, to the radio network controller RNC, a CS calling restriction indication and a CS location registration restriction indication for restricting CS calling processing and CS location registration processing in the circuit switching exchange MSC.

At step S305, the radio network controller RNC creates broadcast information including the received CS calling restriction indication and CS location registration restriction indication, and at step S306 transmits the created broadcast information through broadcast to a specific area.

At step S307, by receiving and analyzing the broadcast information, the mobile station UE recognizes that the CS calling processing and the CS location registration processing are restricted in the specific area and suppresses the Cs calling processing and the CS location registration processing in the specific area.

Fourthly, by referring to FIG. 19, the description will be given of an operation which is performed in a case where Cs calling restrict and PS location registration restrict are performed in the mobile communication system according to the present embodiment.

At step S401, a plurality of mobile stations UE transmit Cs calling requests, and at step S402 transmit PS location registration requests.

At step S403, the circuit switching exchange MSC receives a large amount of the CS calling requests, which causes congestion.

At step S404, the circuit switching exchange MSC transmits, to the radio network controller RNC, CS calling restriction indication for restricting the Cs calling processing in the circuit switching exchange MSC.

In addition, at step S405, the packet switching exchange SGSN receives a large amount of the PS location registration requests, which causes congestion.

At step 6406, the packet switching exchange SGSN transmits, to the radio network controller RNC, a PS location registration restriction indication for restricting the PS location registration processing in the packet switching exchange SGSN.

At step S407, the radio network controller RNC creates broadcast information including the received CS calling restriction indication and PS location registration restriction indication, and at step S408 transmits the created broadcast information through broadcast to a specific area.

At step S409, by receiving and analyzing the broadcast information, the mobile station UE recognizes that the CS calling processing and the PS location registration processing are restricted in the specific area and suppresses the CS calling processing and the PS location registration processing in the specific area.

Fifthly, by referring to FIG. 20, the description will be given of an operation which is performed in a case where CS location registration restrict is cancelled.

At step S501, the radio network controller RNC creates broadcast information including a CS location registration restriction indication and transmits the created broadcast information as "SYSTEM INFORMATION" through broadcast.

At step S502, by receiving and analyzing the broadcast information, the mobile station UE which has moved to the specific area recognizes that the CS location registration is restricted in the specific area and suppresses the CS location registration in the specific area.

At step S503, the mobile station UE uses "Routing Area Update Request (update type: RA updating)" to transmit a PS location registration request to the packet switching exchange SGSN in the specific area.

At step S504, the mobile station UE receives, from the packet switching exchange SGSN, "Routing Area Update Accept (update result: RA updated)" notifying that the PS location registration processing is completed in the specific area.

At step S505, the circuit switching exchange MSC transmits, to the radio network controller RNC, a CS location registration restrict cancellation instruction for instructing to cancel the restrict of the CS location registration processing in the specific area.

At step S506, the radio network controller RNC creates broadcast information including the received CS location registration restrict cancellation instruction, and at step S507 transmits "Paging Type 1 (bcch modify)", and thereafter at step S508 transmits the created broadcast information as "SYSTEM INFORMATION" through broadcast to the specific area.

At step S509, by receiving and analyzing the broadcast information, the mobile station UE recognizes that the restrict of the location registration processing is cancelled in the specific area.

At step S510, the mobile station UE uses "Routing Area Update Request (update type: combined RA LA updating with IMSI attach)" to transmit a CS location registration request to the packet switching exchange SGSN in the specific area.

At step S511, the packet switching exchange SGSN transmits, to the circuit switching exchange MSC, a CS location registration request for the mobile station UE in response to the received "Routing Area Update Request (update type: combined RA·LA updating with IMSI attach)".

At step S512, the packet switching exchange SGSN transmits to the mobile station UE "Routing Area Update Accept (update result: combined RA/LA updated)" that is a notification of completion of the CS location registration processing in the specific area.

Advantageous Effects of the Mobile Communication System According to the First Embodiment of the Present Invention According to the mobile communication system according to the first embodiment of the present invention, the restriction indication transmitter 12 of the switching exchange MSC or SGSN specifies and restricts the processing which causes congestion in each exchange, so that an adverse effect on the processing that should not be restricted can be avoided.

In addition, according to the mobile communication system according to the first embodiment of the present embodiment, the restriction indication transmitter 12 of the switching exchange MSC or SGSN continuously transmits restriction indications in a specific place (such as a boundary of a location registration area on a rail road) in order to restrict specific processing (location registration processing) in the specific place in advance, so that a state of congestion can be avoided.

What is claimed is:

1. A mobile communication system, comprising:
a congestion detector configured to detect congestion in processing types in the mobile communication system; and
a radio network controller including
a broadcast information transmitter configured to transmit, to a mobile station, broadcast information including a restriction indication per processing indicating an existence of a restriction for each of the congested processing types, a restriction indication per access class indicating an existence of a restriction for each of access classes, and a restriction indication per domain indicating an existence of a restriction for each of domains,
the mobile station including
a broadcast information receiver configured to receive the broadcast information transmitted from the radio network controller; and
a processor configured to suppress a specific processing for an exchange, based on a combination of the restriction indication per processing, the restriction indication per access class, and the restriction indication per domain, wherein
the restriction indication per processing includes a restriction indication of location registration processing indicating an existence of a restriction for a location registration processing.

2. The mobile communication system according to claim 1, wherein
the congestion detector detects congestion in location registration processing from a location area of a base station,
the broadcast information transmitter transmits a restriction indication for location registration processing of location registration to the mobile station, the mobile station in the location area of the base station, and
the processor of the mobile station suppresses location registration processing at the mobile station in response to the mobile station receiving the restriction indication for location registration processing.

3. The mobile communication system according to claim 1, wherein the broadcast information transmitter is configured to transmit the restriction indication of location registration processing when the mobile station moves from a first location registration area to a second location registration area.

4. A method for mobile communication, the method comprising:
detecting congestion in processing types in the mobile communication;
transmitting, from a radio network controller to a mobile station, broadcast information including a restriction indication per processing indicating an existence of a restriction for each of the congested processing types, a restriction indication per access class indicating an existence of a restriction for each of access classes, and a restriction indication per domain indicating an existence of a restriction for each of domains; and
suppressing, at the mobile station, a specific processing for an exchange, based on a combination of the restriction indication per processing, the restriction indication per access class, and the restriction indication per domain, wherein
the restriction indication per processing includes a restriction indication of location registration processing indicating an existence of a restriction for a location registration processing.

5. The method according to claim 4, further comprising:
detecting congestion in location registration processing from a location area of a base station;
transmitting a restriction indication for location registration processing of location registration to the mobile station, the mobile station in the location area of the base station, and
suppressing location registration processing, at the mobile station, in response to the mobile station receiving the restriction indication for location registration processing.

6. The method according to claim 4, wherein the transmitting, from the radio network controller to the mobile station, the broadcast information including the restriction indication per processing including the restriction indication of location registration processing is performed when the mobile station moves from a first location registration area to a second location registration area.

7. A mobile station comprising:
a broadcast information receiver configured to receive broadcast information transmitted from a radio network controller; and
a processor configured to suppress a specific processing for an exchange, based on a combination of a restriction indication per processing indicating an existence of a restriction for each of congested processing types, a restriction indication per access class indicating an existence of a restriction for each of access classes, and a restriction indication per domain indicating an existence of a restriction for each of domains, which are included in the received broadcast information, wherein
the restriction indication per processing includes a restriction indication of location registration processing indicating an existence of a restriction for a location registration processing.

8. The mobile station according to claim 7, wherein
the mobile station is in a location area of a base station,
the broadcast information receiver receives a restriction indication for location registration processing of location registration based on congestion in location registration processing from the location area, and
the processor suppresses location registration processing at the mobile station in response to the mobile station receiving the restriction indication for location registration processing.

9. The mobile station according to claim 7, wherein the broadcast information receiver is configured to receive the broadcast information transmitted from the radio network controller, which includes the restriction indication per processing including the restriction indication of location registration processing, when the mobile station moves from a first location registration area to a second location registration area.

* * * * *